Dec. 30, 1969   D. STUBBS ET AL   3,486,360
ADJUSTMENT UNIT

Filed Dec. 27, 1967   2 Sheets-Sheet 2

INVENTORS
DENNIS STUBBS,
ERIC O. SWIFT &
ERIC CARROLL

HENRY C. WESTIN
THEIR ATTORNEY

United States Patent Office 3,486,360
Patented Dec. 30, 1969

3,486,360
ADJUSTMENT UNIT
Dennis Stubbs, Sheffield, Eric Owen Swift, Rotherham, and Eric Carroll, Sheffield, England, assignors to Davy and United Engineering Company Limited, Sheffield, England
Filed Dec. 27, 1967, Ser. No. 693,892
Claims priority, application Great Britain, Jan. 2, 1967, 24/67
Int. Cl. B21b *31/32;* B66f *3/24*
U.S. Cl. 72—245                                                10 Claims

ABSTRACT OF THE DISCLOSURE

A unit positionable in a rolling mill between the roll assemblies comprises a short stroke hydraulic ram connected in series with a long stroke adjusting element and the operation of the ram or the operation of the element varies the overall dimensions of the unit. The long stroke element is locked against movement except when it is positively driven. The long stroke element is used under zero rolling load conditions to adjust the roll gap to approximately the required value and thereafter the long stroke element is locked and further adjustment of the roll gap is effected by the short stroke ram.

---

This invention relates to an adjustment unit which may be positioned in a rolling mill for adjusting the roll gap. Previous forms of adjustment units for this purpose have been the conventional screwdowns which act between the housings and the chocks of the adjacent roll, the screws in a so-called prestressed mill which are threaded into the chocks of one back-up roll and engage against the chocks of the other back-up roll, and the hydraulic rams which are arranged between the back-up chocks.

When hydraulic rams are used in adjustment units, it is an advantage to keep the stroke of the rams as small as possible, consistent with proper control, for the reasons given in our co-pending application of even date. Similarly, when a wedge is employed as the control element in an adjustment unit, it is preferable to keep the effective stroke of the wedge, in the separating direction, relatively small, so as to reduce the power of the drive mechanism and hence the response time of the control.

If the adjustment unit has to accommodate, not only changes in gauge required of the rolled material and controlled variations to maintain constant gauge, but also the changes in diameter of the rolls for wear, the stroke required may be too large to permit the use of wedges, hydraulic rams, and like mechanisms.

Thus, in accordance with one aspect of the present invention, an adjustment unit positionable in a rolling mill for adjusting the roll gap comprises a housing carrying a relatively short stroke adjusting element or elements protruding from one end and a relatively long stroke adjusting element or elements protruding from the other end, the long stroke element or elements being locked against movement relative to the housing except when positively driven.

According to a second aspect, an adjustment unit positionable in a rolling mill between the roll assemblies for adjusting the roll gap comprises a relatively short stroke hydraulic ram or rams connected in series with a relatively long stroke adjusting element or elements, the operation of the ram or rams or the operation of the long stroke element or elements varying the overall dimensions of the unit, and the long stroke element or elements being locked against movement except when positively driven.

The long stroke element or elements may then be used, under zero rolling load, to adjust the mill for roll turn-down and to bring the roll gap to approximately the required value, with the short stroke element or elements as approximately mid range. Thereafter, the long stroke element or elements may be locked and further adjustment of the roll gap effected by the short stroke element or elements.

The long stroke adjusting element, or each such element, may be a screw jack arranged so as not to back drive under the loads applied to it. Alternatively, it may be a hydraulic jack with means for locking and releasing the piston relative to the cylinder.

Figure 1:
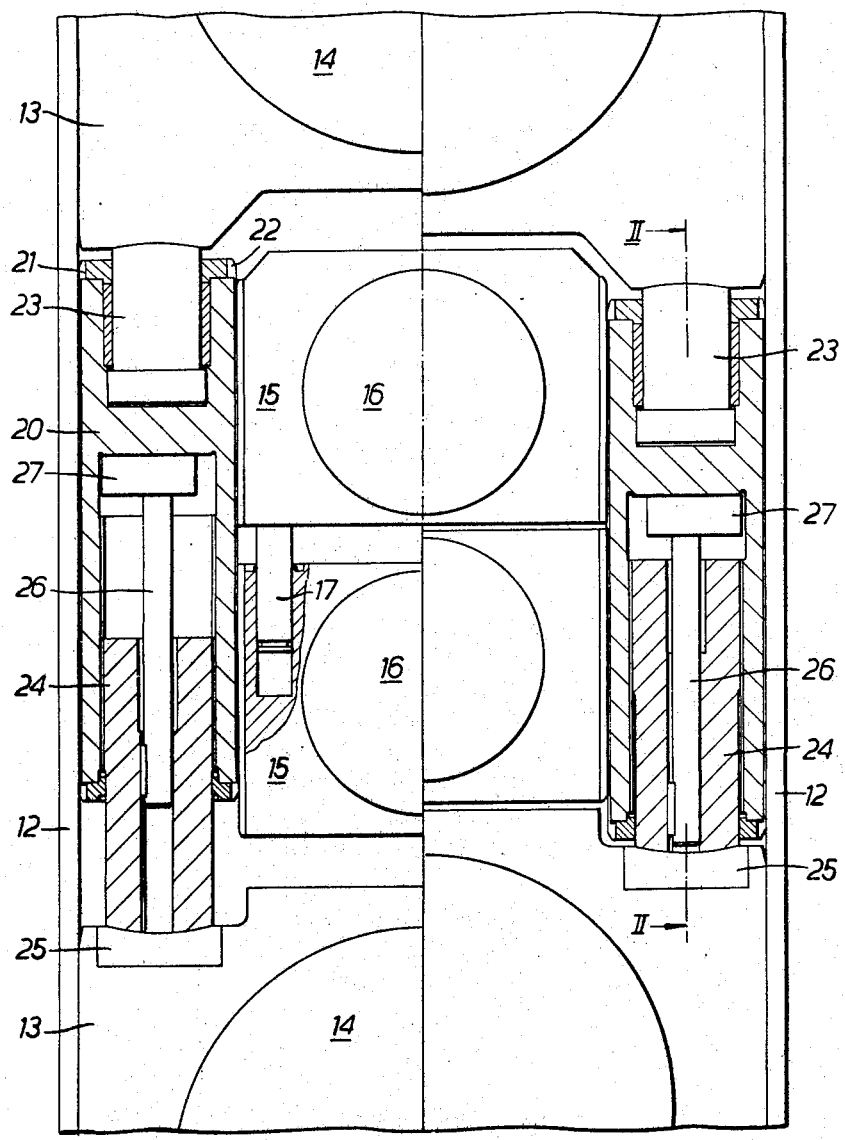
Figure 2:
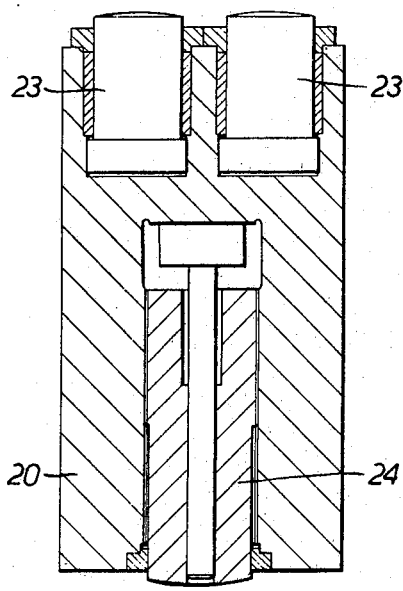
Figure 3:
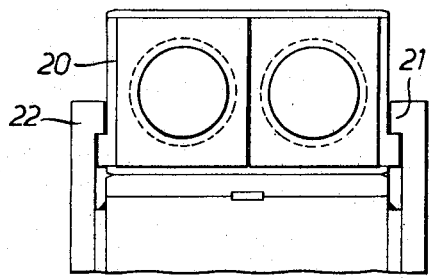
Figure 4:
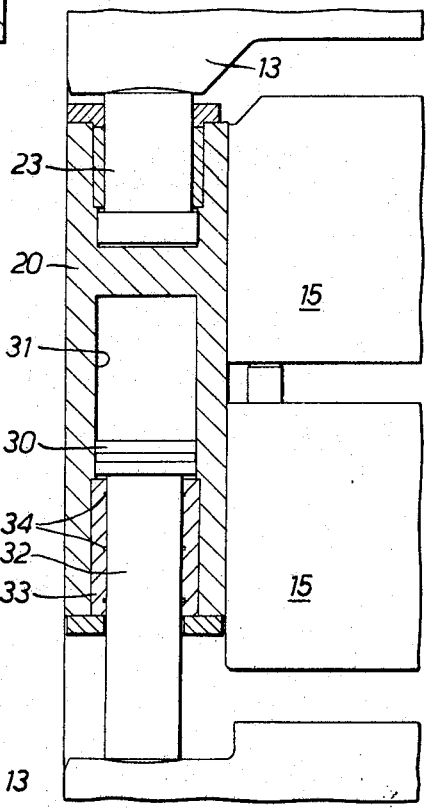

The invention will be more readily understood by way of example from the following description of two adjusting units in accordance therewith, reference being made to the accompanying drawings, in which FIGURE 1 is a sectional view of part of a 4-high rolling mill showing two adjusting units between the back-up chocks, FIGURE 2 is a section through the adjusting unit only, on the line II—II of FIGURE 1, FIGURE 3 is a plan view of one of the adjusting units, and FIGURE 4 is a sectional view of a second form of adjusting unit, mounted in a rolling mill.

Referring to FIGURES 1 to 3, the rolling mill is illustrated by the slideways 12 of the window of one of the mill housings, the chocks 13 for the back-up rolls 14, the chocks 15 for the work rolls 16, and the work roll balance cylinders, one of which is indicated at 17. In FIGURE 1, two adjusting units are illustrated, one at each side of the work roll chocks 15 and acting between the back-up chocks 13. It will be understood that there is a similar arrangement in the other housing.

Each of the adjusting units consists of a block or housing 20, which is guided for vertical movement in the housing by the guides 21, which are attached to the housing window, and by similar guides 22 located between the work roll chocks 15 and the adjusting units. A short stroke adjusting element or elements is or are carried at one end of the block 20 to engage against one of the back-up roll chocks 13; in FIGURES 1 to 3 there are two short-stroke hydraulic rams arranged in parallel, the cylinders being formed in the block 20 and the piston rods 23 projecting from the cylinders and engaging against the undersurface of the upper back-up chock 13. In the present case, two hydraulic rams are employed in parallel, in order that the necessary force may be applied; a single ram positionable within the confines of the block 20 would not have sufficient cross-sectional area to apply the necessary force.

Each block 20 also carries a long stroke adjusting element, effectively in series with the short stroke ram. In the form shown in FIGURES 1 to 3 the long stroke element consists of the externally threaded screw 24, which is threaded into the block 20 and which projects out of the block 20 to engage against a bearing pad 25 in the lower back-up roll chock 13. A central rod 26 is splined to the screw 24 and carries at its upper end a worm wheel 27, which is driven through a worm (not shown) from a motor. The drive for the two adjustment units of the housing is preferably synchronised.

In operation, with no strip in the mill and with the hydraulic rams 23 in approximately mid stroke and the screws 24 retracted the roll gap is set using conventional equipment fitted to the mill. The motors are then driven to vary the effective lengths of the four adjustment units until limit switches fitted between the block 20 and the upper chock 13 stop the motor with a gap between the top of the ram 23 and the chock, i.e. about ¾″. The hydraulic rams 23 then have limited stroke of, say, ±¾″ and are employed during normal running of the mill, when the strip gauge is to be changed, and to control the mill automatically to maintain gauge, as described in specifications Nos. 52,116/64 and 18,586/65. As roll wear occurs, the hydraulic rams 23 may be unable to accommodate the consequential changes in the separation of the back-up chocks 13; when this occurs, the screw jacks 24, 20 are readjusted, between passes, in order to bring the hydraulic rams 23 back to mid range with the required roll gap. Similarly, when roll change occurs, the screw jacks are again brought into operation. Because of the relatively small thickness of oil trapped below the pistons of the hydraulic rams 23, those rams are particularly stiff, thereby increasing the overall stiffness of the mill. If the hydraulic rams were so dimensioned as to accommodate all the variation necessary in the adjustment units, the trapped columns of oil would be such as to render the mill soft.

FIGURE 4 shows a modification of the adjustment unit of FIGURES 1 to 3, in which the screw jack is replaced by a second hydraulic jack, which however, is locked against movement, except when adjustment is required for roll wear or roll change. As before, the adjustment unit comprises a block 20 in one end of which there is a hydraulic ram, the piston rod 23 of which protrudes from the block 20 and engages the upper back-up chock 13. The long stroke adjusting element consists of a piston 30 mounted in a cylinder passage 31 in the block 20 and having a piston rod 32 engaging against the lower back-up roll chock 13. The rod 32 is normally held against movement relative to the block 20 by a sleeve 33, which is secured in the block 20 and which tightly grips the piston rod 32. At the interface with the rod 32, the sleeve 33 is formed with passages 34 which can be supplied with oil under pressure in order to expand the sleeve 33 and thereby permit movement of the piston 30 and piston rod 32.

The operation is generally as described in relation to FIGURES 1 to 3. When a large adjustment, beyond the capacity of the short stroke ram 23, is required, the sleeve 33 is hydraulically expanded when adjustment is to be made and the roll gap is set as before, liquid being supplied to one side or the other of the piston 30 to bring the roll gap to the required dimensions with the hydraulic rams 23 in mid position. Thereafter the sleeve 33 is released, thereby locking the piston 30, the supply to the cylinder 31 is released, and subsequent adjustment of the roll gap effected by the short stroke ram 23. It will of course be appreciated that there is a similar adjustment unit to that illustrated at the other side of the work roll chocks 15, and another pair in the other housing.

We claim:

1. An adjustment unit positionable in a rolling mill for adjusting the roll gap comprising a housing, at least one relatively short stroke adjusting element carried by said housing and protruding from one end thereof, at least one relatively long stroke adjusting element carried by said housing and protruding from the other end thereof, and means for locking the long stroke element against movement relative to the housing except when positively driven.

2. An adjustment unit positionable in a rolling mill between the roll assemblies for adjusting the roll gap comprising a housing, at least one relatively short stroke hydraulic ram carried by the housing, at least one relatively long stroke adjusting element carried by the housing and connected in series with said ram whereby the operation of the ram or the operation of the long stroke element varies the overall dimensions of the unit and means for locking the long stroke element against movement relative to the housing except when positively driven.

3. An adjustment unit as claimed in claim 2 in which two short stroke hydraulic rams are provided and the rams are arranged to act in parallel and are positioned side by side at one end of said housing.

4. An adjustment unit as claimed in claim 2 in which said long stroke adjusting element is a screw jack and means are provided for preventing the screw jack from back driving under the loads applied to it.

5. An adjustment element as claimed in claim 4 in which said screw jack comprises a threaded tube which mates with a threaded bore of the housing and which is rotatable relative thereto to vary the length of the tube protruding from one end of the housing.

6. An adjustment unit according to claim 5 in which a rod is located coaxial with said tube and in driving engagement therewith and worm gear means are provided on said rod for rotating said rod.

7. An adjustment unit as claimed in claim 2 in which said long stroke adjusting element is a hydraulic jack comprising a cylinder, a piston in said cylinder, a piston rod connected to said piston, and means for locking and releasing the piston relative to the cylinder.

8. An adjustment unit as claimed in claim 7 in which the means for locking and releasing a piston comprises a sleeve secured in the housing and an interference fit on said piston rod and means for supplying oil under pressure to the interface of the rod and the sleeve to outwardly expand the sleeve and thereby permit movement between the rod and the sleeve.

9. An adjustment unit positionable in a rolling mill between the roll assemblies for adjusting the roll gap comprising a cylindrical block defining a pair of cylinders positioned side by side at one end and having a longitudinal bore at the other end, a pair of short stroke pistons arranged one in each said cylinders and arranged to act in parallel, an externally threaded tube positioned in said bore and mating with a threaded wall defining said bore so as to be rotatable relative thereto to vary the length of the tube protruding from the end of the block, a rod coaxial with said tube and in driving engagement therewith, and worm gear means in driving engagement with said rod to rotate said rod and prevent the tube from rotating under a load applied to it.

10. In a rolling mill having a housing including a window for receiving a pair of work roll assemblies each backed up by a backup roll assembly, said assemblies including chocks for rotatably supporting said rolls in said window, an adjustable means positionable between the chocks of said backup roll assemblies for adjusting the roll gap comprising a frame, at least one relatively short stroke adjusting element carried by said frame and protruding from one end thereof, at least one relatively long stroke adjusting element carried by said frame and protruding from the other end thereof, and means for locking the long stroke element against movement relative to the frame except when positively driven.

References Cited

UNITED STATES PATENTS

| 1,935,091 | 11/1933 | Iversen | 72—239 |
| 3,321,182 | 5/1967 | Elenburg | 254—93 |

FOREIGN PATENTS

| 971,409 | 9/1964 | Great Britain. |

CHARLES W. LANHAM, Primary Examiner

B. J. MUSTAIKIS, Assistant Examiner

U.S. Cl. X.R.

254—93